US008272064B2

(12) United States Patent
Kao et al.

(10) Patent No.: US 8,272,064 B2
(45) Date of Patent: Sep. 18, 2012

(54) AUTOMATED RULE GENERATION FOR A SECURE DOWNGRADER

(75) Inventors: Anne S-W Kao, Bellevue, WA (US); Stephen R. Poteet, Bellevue, WA (US); Nicholas J. Multari, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 1460 days.

(21) Appl. No.: 11/280,610

(22) Filed: Nov. 16, 2005

(65) Prior Publication Data

US 2007/0113292 A1 May 17, 2007

(51) Int. Cl.
H04L 29/06 (2006.01)
(52) U.S. Cl. ........................................................ 726/27
(58) Field of Classification Search ...................... 726/27
See application file for complete search history.

(56) References Cited

U.S. PATENT DOCUMENTS

| | | | | |
|---|---|---|---|---|
| 5,933,498 A * | 8/1999 | Schneck et al. | ................ | 705/54 |
| 5,960,080 A * | 9/1999 | Fahlman et al. | ............... | 380/252 |
| 5,991,709 A * | 11/1999 | Schoen | ............................ | 704/1 |
| 6,161,130 A * | 12/2000 | Horvitz et al. | ................ | 709/206 |
| 6,598,161 B1 * | 7/2003 | Kluttz et al. | ................... | 713/166 |
| 6,611,825 B1 | 8/2003 | Billheimer et al. | ............. | 706/45 |
| 6,643,686 B1 * | 11/2003 | Hall | ............................... | 709/206 |
| 6,678,822 B1 * | 1/2004 | Morar et al. | ................... | 713/182 |
| 6,697,998 B1 | 2/2004 | Damerau et al. | ............... | 715/512 |
| 6,701,305 B1 | 3/2004 | Holt et al. | ....................... | 706/45 |
| 6,792,415 B2 | 9/2004 | Shih et al. | .......................... | 707/2 |
| 6,804,669 B2 | 10/2004 | Aggarwal | ........................... | 707/6 |
| 6,882,747 B2 | 4/2005 | Thawonmas et al. | ......... | 382/190 |
| 7,089,241 B1 * | 8/2006 | Alspector et al. | ...................... | 1/1 |
| 7,249,162 B2 * | 7/2007 | Rounthwaite et al. | ......... | 709/206 |
| 7,322,047 B2 * | 1/2008 | Redlich et al. | ................... | 726/27 |
| 7,426,497 B2 * | 9/2008 | Bacioiu et al. | ................... | 706/12 |
| 7,464,264 B2 * | 12/2008 | Goodman et al. | ............. | 713/154 |
| 7,467,202 B2 * | 12/2008 | Savchuk | ........................ | 709/224 |
| 7,484,107 B2 * | 1/2009 | Forlenza et al. | ............... | 713/193 |
| 7,640,305 B1 * | 12/2009 | Arthur et al. | ................... | 709/206 |
| 2002/0073313 A1 * | 6/2002 | Brown et al. | ................... | 713/165 |
| 2002/0078349 A1 * | 6/2002 | Marso et al. | .................... | 713/166 |
| 2004/0162795 A1 * | 8/2004 | Dougherty et al. | .............. | 706/20 |
| 2005/0138109 A1 | 6/2005 | Redlich et al. | ................. | 709/201 |
| 2008/0215517 A1 * | 9/2008 | Johnson et al. | .................. | 706/47 |

* cited by examiner

Primary Examiner — Edan Orgad
Assistant Examiner — James Turchen
(74) Attorney, Agent, or Firm — Armstrong Teasdale LLP (57) ABSTRACT

A system generates rules for classifying documents are generated by building a vocabulary of features (e.g., words, phrases, acronyms, etc.) that are related to classifying concepts. The system includes a security document reader receives a security document that defines security concepts for a particular project and parses the security document to separate the security concepts. A vocabulary builder receives samples provided by the user that contain information related to the project. For each security concept, the vocabulary builder uses statistical analysis techniques to find features in the samples that are related to that concept. A rule generation assistant, for each security concept, generates rules based on the built vocabulary and the samples. The rule generation assistant uses statistical analysis techniques on the vocabulary and samples to determine features that optimally predict a particular concept. The rules can be used by a downgrader to process information to be distributed.

14 Claims, 5 Drawing Sheets

AUTOMATED RULE GENERATION FOR A SECURE DOWNGRADER

FIELD

Embodiments of the present invention relate generally to computer systems and, more particularly, to computer systems for classifying documents.

BACKGROUND

Sharing information between individuals or organizations may be needed to perform or collaboratively work on a project. However, it is often desirable for each individual or organization to keep some information confidential or undisclosed. This confidentiality requirement can extend to the other entities with which some information is being shared. In some scenarios, a guideline is prepared that defines concepts that are to be kept confidential for the project. In some such scenarios, a trained security person must review and learn the concepts of the guideline, and then with the concepts in mind, review any information (e.g., a document) to be provided with another individual or organization. If the information contains confidential subject matter, the trained security person may then prevent release of the information, or release the information after redacting the confidential portions. The review process tends to be costly in time and resources, especially if there are many documents to be shared. Although some shortcomings of conventional systems are discussed, this background information is not intended to identify problems that must be addressed by the claimed subject matter.

SUMMARY

According to aspects of various described embodiments, rules for classifying documents are generated by building a vocabulary of features (e.g., words, phrases, acronyms, etc.) that are related to received classifying concepts (e.g., a security document). In one aspect, a system for generating rules for classifying documents includes a security document reader, a vocabulary builder and a rule generation assistant. The security document reader receives a security document that defines security concepts for a particular project and parses the security document to separate the security concepts. The vocabulary builder receives samples provided by the user that contain information related to the project. For each security concept, the vocabulary builder uses statistical analysis techniques to find features (e.g., words or phrases) in the samples that are related to that concept. In some implementations, the vocabulary builder can perform a search to find additional documents to use as samples. The rule generation assistant, for each security concept, then generates rules based on the built vocabulary and the samples. For example, the rule generation assistant can use statistical analysis techniques on the vocabulary and samples to determine features that best predict a particular concept. The rules can be used by a downgrader to process information to be shared with other individuals or organizations.

In another aspect, the rule generation assistant includes a relatedness module that can organize the security concepts into groups that allows for distinguishing between similar concepts. For example, features that are related to chemicals and biological agents may be classified, but if the features are related to medical applications, then the features may not be classified. The relatedness module makes such determinations.

In yet another aspect, the rule generation assistant is interactive so that a user may "manually" modify rules generated by the rule generation assistant. For example, due to a small number of samples, the rule generation assistant may generate a rule containing an unlikely feature. The user can manually delete the rule or feature.

In still another aspect, the rule generation assistant may generate a numerical value for each rule that represent the probability that the rule predicts the security concept and compare the numerical value to a threshold. The threshold may be manually set so that the rules will be more accurate but perhaps allowing some confidential information to be shared, or to be more conservative (reducing the amount of confidential information that is shared) but perhaps preventing non-confidential information from being shared.

Embodiments may be implemented as a computer process, a computer system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (a) as a sequence of computer implemented steps running on a computing system and/or (b) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Figure 1:
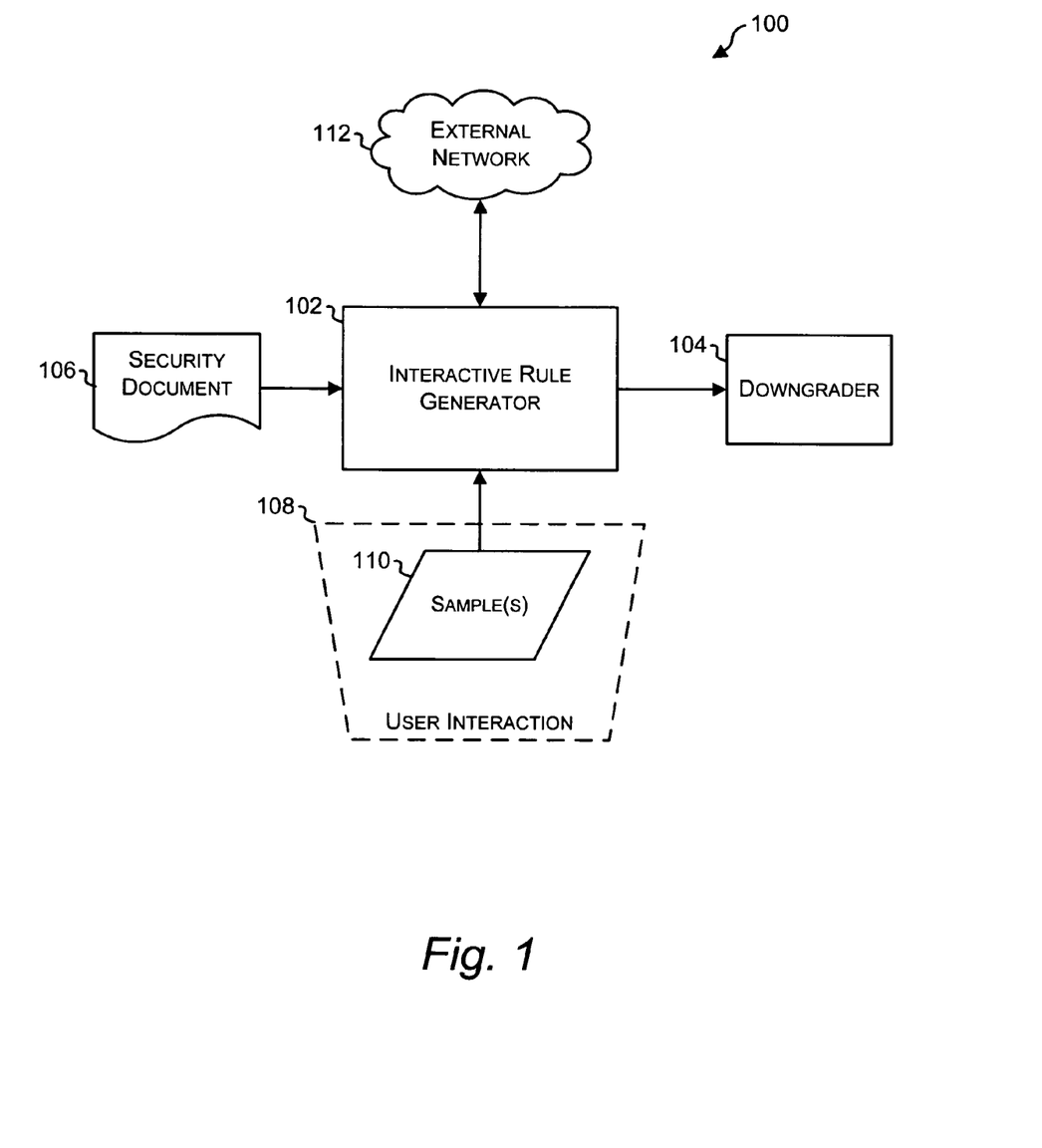
FIG. 1 is a diagram illustrating an exemplary system for generating rules for classifying documents, according to one embodiment.

FIG. 1 illustrates an exemplary system 100 for generating rules for use by a downgrader in classifying information related to a particular project, according to one embodiment. In this embodiment, system 100 includes an interactive rule generator 102, and a downgrader 104. As used herein, the term "downgrader" refers to any system, component or process used to inspect or filter information being considered for dissemination to prevent information that is to remain confidential from being inadvertently disseminated; and the term "downgrading" refers to the process of inspecting or filtering information being considered for dissemination to prevent information that is to remain confidential from being inadvertently disseminated. The interactive rule generator 102 receives a security document 106, typically provided in electronic form by a user (e.g., a security officer). The security document 106 contains security concepts for the project. For example, in one scenario a concept is 'nuclear weapons'. Anything related to nuclear weapons will be sensitive information. However, commercial use of nuclear technology for a power plant will not be considered sensitive.

The interactive rule generator 102 then parses the security document to separate out each security concept, in this embodiment. Via user interaction 108, the interactive rule generator 102 receives one or more samples 110 from a user. The sample(s) 110 are typically text documents in electronic form that the user knows have information related to the project. For example, the sample(s) 110 may have been generated to define the project or as a result of the project, thereby having a high likelihood of features (e.g., words, phrases, etc.) that are related to security concepts contained in the security document 106. In some embodiments, one or more standard text mining techniques are used to find terms in the samples 110 (and possibly any search results from searches performed via the external network 112) that are related to each parsed security concept. For example, in one embodiment, a correlation algorithm such as chi square or expected mutual information measure (EMIM) is used to identify related features. The features automatically determined by this algorithm may be edited by the user to eliminate words or phrases that are accidentally correlated with a concept in the sample.

In addition, features for each concept may be supplied from the security guide itself, or derived from an acronym list often provided with each security guide or from a general thesaurus of technical concepts, or from the user's knowledge.

Once an initial set of features has been determined, the interactive rule generator 102 may perform one or more searches (e.g., database searches or web searches) via an external network 112 using these features as search terms. The external network 112 may be an intranet for an organization working on the project so that only internal or proprietary information is searched for features related to the security concepts contained in the security document 106. In other scenarios, the external network 112 may include a public network (e.g., the Internet) so that public information may also be searched for features related to the security concepts.

The features found by the interactive rule generator 102 (from the samples and from any searches) form a vocabulary from which classifying rules can be generated.

The interactive rule generator 102, in some embodiments, then generates one or more rules for each parsed security concept, based on the security concept and the vocabulary built for that security concept. For example, in one embodiment, the interactive rule generator 102 uses the Naïve Bayes algorithm to generate the rules for the security concepts. In one embodiment, the Naïve Bayes algorithm trains on the samples 110.

The downgrader 104 then uses the rules to filter documents being considered for dissemination to other individuals or organizations. The downgrader 104 can be adapted for use in many scenarios in which information is to be disseminated such as, for example: information related to proprietary technology (e.g., developed by a business); information related to national security; medical information; information related to a law suit (e.g., attorney-client privileged information); student information (e.g. grades); credit information; personal information (e.g., address, telephone number, social security number), etc.

Figure 2:
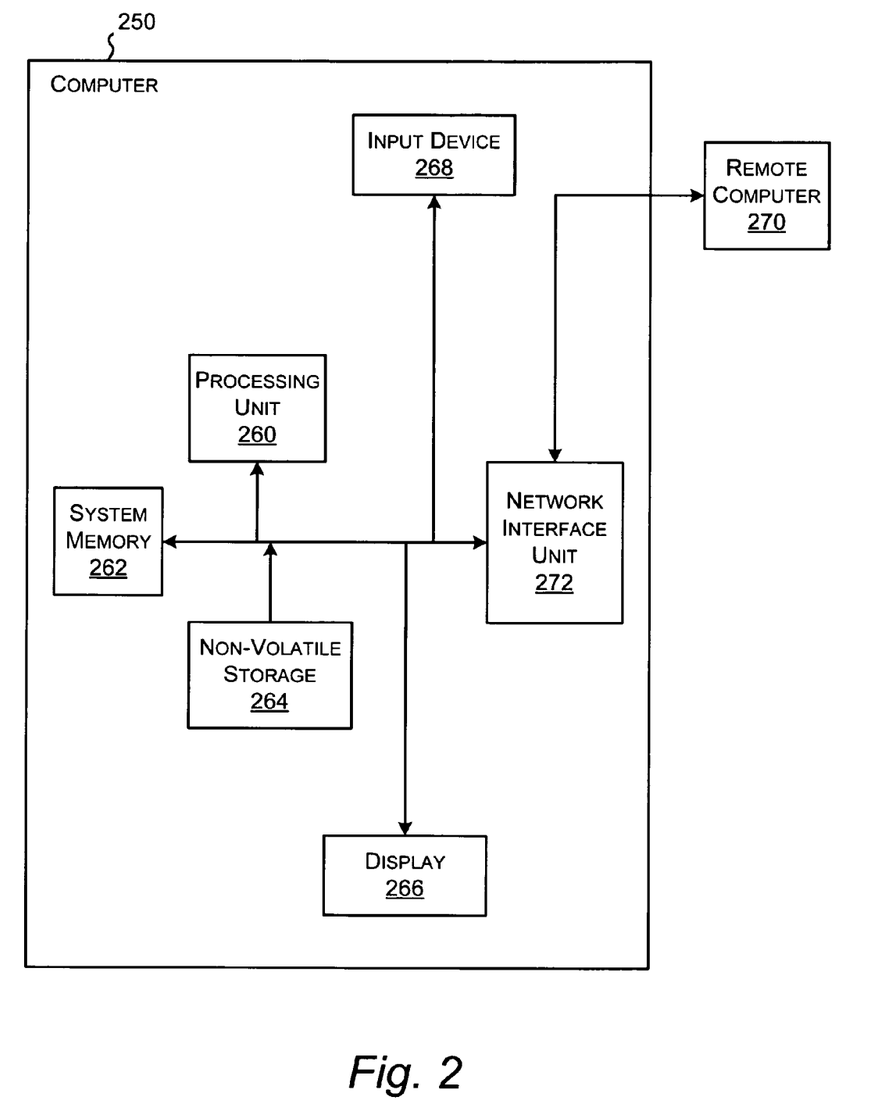
FIG. 2 is a diagram illustrating an exemplary computer suitable for implementing the system depicted in FIG. 1, according to one embodiment.

FIG. 2 illustrates various components of a computer 250 on which system 100 (FIG. 1) may be implemented, according to one embodiment. This embodiment of computer 250 includes a processing unit 260 and a system memory 262 which includes random access memory (RAM) and read-only memory (ROM). Computer 250 also includes nonvolatile storage 264, such as a hard disk drive, where data is stored. Computer 250 can also include one or more input devices 268, such as a mouse, keyboard, etc. A display 266 is provided for viewing data, and interacting with a user interface. Computer 250 may be connected to one or more remote computers 270 via a network interface unit 272. The connection may be over a local area network (LAN) wide area network (WAN), and includes all of the necessary circuitry for such a connection. A computer typically includes additional components that are not shown in FIG. 2; however, these generally conventional components are omitted as they are well known in the art.

Figure 3:
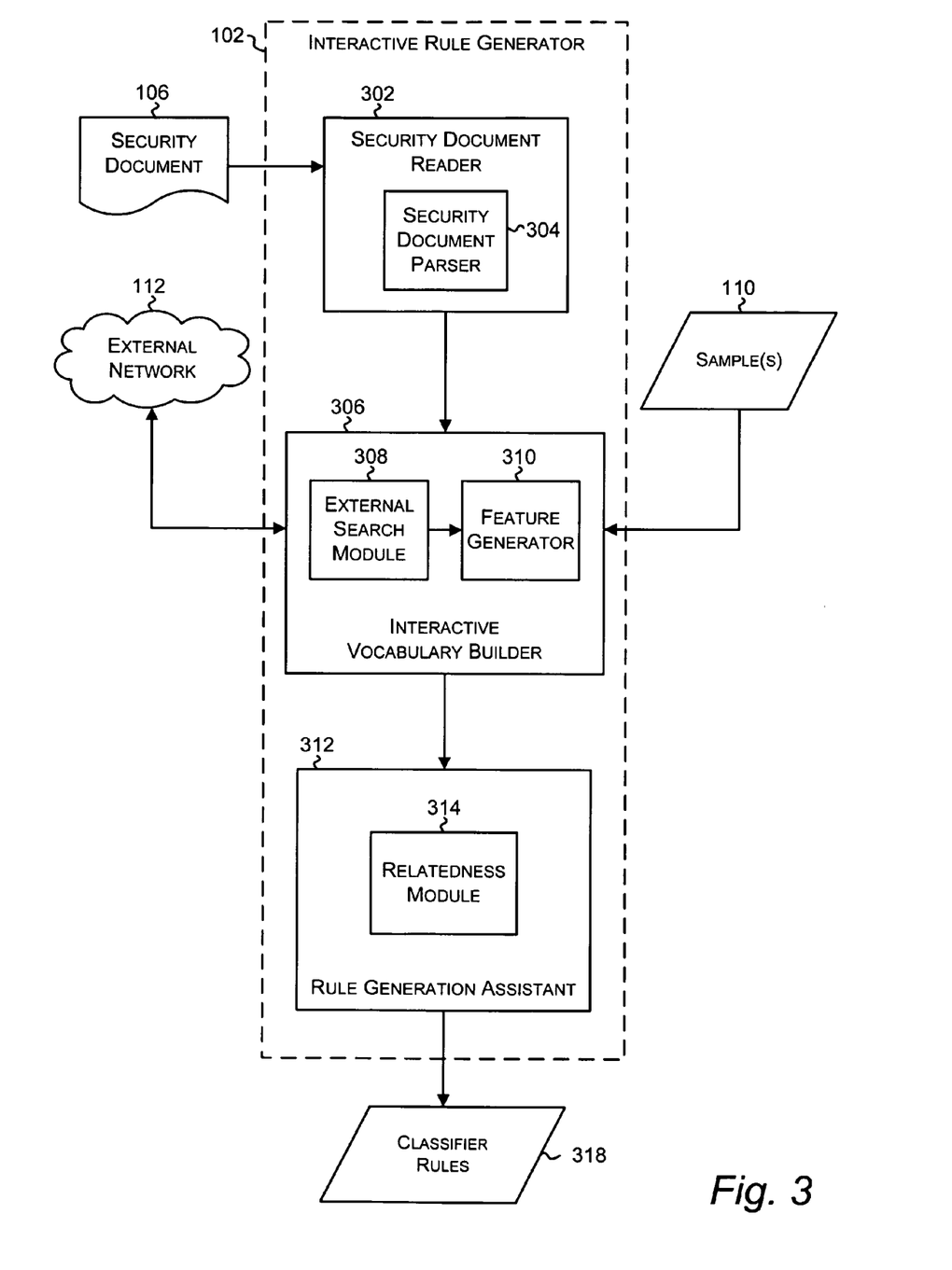
FIG. 3 is a diagram illustrating exemplary components of the system depicted in FIG. 1, according to one embodiment.

FIG. 3 illustrates exemplary components of the interactive rule generator 102 (FIG. 1), according to one embodiment. In this embodiment, the interactive rule generator 102 includes a security document reader 302 with a security document parser 304, an interactive vocabulary builder 306 having an external search module 308 and a feature generator 310, and a rule generation assistant 312 with a relatedness module 314.

The security document reader 302 is a module that receives the security document 106. For example, in one embodiment, the security document reader 302 can receive and process documents in standard formats such as Microsoft Word, XML (extensible markup language) HTML (hypertext markup language) etc. The security document parser 304 separates out the security concepts contained in the security document 106. In one embodiment, each security concept of the security document 106 is defined in a numbered paragraph. The security parser 304 can inspect the security document 106 for numbered paragraphs to perform the parsing function.

The feature generator 310 is a module that finds features that are related to the security concepts. In one embodiment, the feature generator 310 uses standard text mining techniques to find features in the samples 110 that are related to the words and phrases of each parsed security concept. For example, in one embodiment, a correlation algorithm such as chi square or expected mutual information measure (EMIM) is used to identify related features in the samples 110. The features found by the feature generator 102 form a vocabulary from which classifying rules can be generated. In addition, in some embodiments, a user can manually add features to the vocabulary.

The external search module 308 is a search engine that can perform searches via the external network 112 using features generated by the feature generator 310. In some embodiments, the external search module 308 is omitted from the interactive rule generator 102. The documents found by the external search module 308 are then used as additional samples that are then processed by the feature generator 310 (as described above) to find additional features. As previously described, the external network 112 may be an intranet for an organization working on the project so that only internal or proprietary information is searched for features related to the security concepts contained in the security document 106. In other scenarios, the external network 112 may include a public network (e.g., the Internet) so that public information may also be searched for features related to the security concepts.

The rule generation assistant 312 is a module that receives the vocabulary from the interactive vocabulary builder 306 and then generates one or more rules 318 for each parsed security concept. In one embodiment, the rule generation assistant 312 generates rules for a security concept based on the security concept and the vocabulary built for that security concept. For example, in one embodiment, the interactive rule generator 102 uses a Naïve Bayes Classifier algorithm to generate the rules for the security concept.

The relatedness module 314 organizes the security concepts into groups that allows for distinguishing between similar concepts. In some scenarios, the relatedness module 314 in effect identifies "exceptions" to a rule. For example, features that are related to chemicals and biological agents may be classified, but if these features appear in a medical treatment context, then finding the features in a document may indicate that the document (or that portion of the document) need not be classified. In one embodiment, the relatedness module 314 is implemented as a text clustering algorithm, optionally applied to a text representation as described in U.S. Pat. No. 6,701,305. In some embodiments, the relatedness module 314 performs this organization function immediately after the security document parser 304 separates out the security concepts contained in the security document 106.

In some embodiments, the rule generation assistant 312 is interactive so that a user may "manually" modify rules 318 generated by the rule generation assistant 312. For example, if there are only a small number of samples, the rule generation assistant may generate a rule 318 containing an unlikely feature. The user can manually delete the rule or feature.

In other embodiments, the rule generation assistant may generate a numerical value for each rule that represent the probability that the rule predicts the security concept and compare the numerical value to a threshold. The threshold may be manually set so that the rules will be more accurate but perhaps allowing some confidential information to be shared, or to be more conservative (reducing the amount of confidential information that is shared) but perhaps preventing non-confidential information from being shared.

Figure 4:
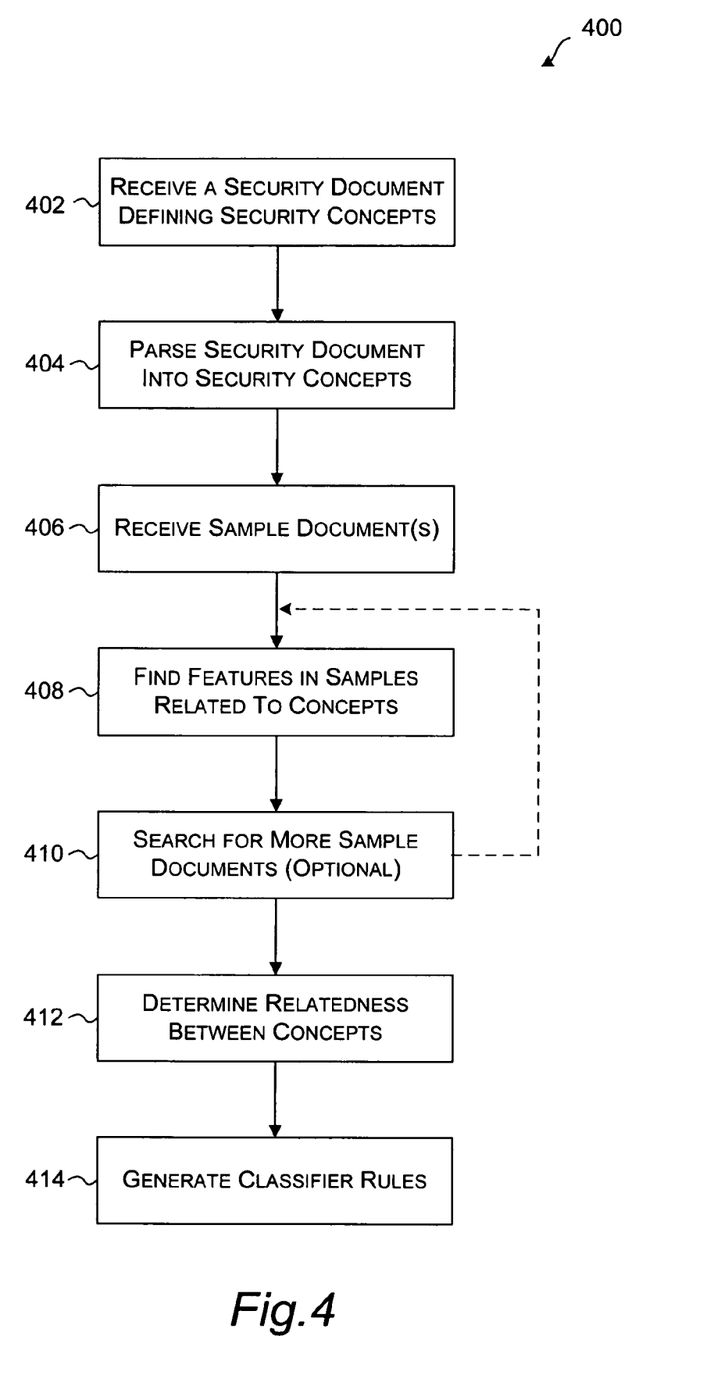
FIG. 4 is a flow diagram illustrating operational flow in generating rules from a security document to classify documents, according to one embodiment.

FIG. 4 illustrates an operational flow 400 for generating rules for classifying documents, according to one embodiment. Operational flow 400 may be performed in any suitable computing environment. For example, operational flow 400 may be performed by a system such as the system 100 (FIGS. 1, 3). Therefore, the description of operational flow 400 may refer to at least one of the components of FIG. 1 or 3. However, any such reference to components of FIG. 1 or 3 is for descriptive purposes only, and it is to be understood that the implementations of FIGS. 1 and 3 are non-limiting environments for operational flow 400.

At a block 402, a security document is received. In one embodiment, a reader such as, for example, the security document reader 302 (FIG. 3) reads a security document such as the security document 106 (FIG. 1). The security document contains security concepts developed for a particular project. In on embodiment, a user that is charged with enforcing security requirements on distribution or sharing of information provides the security document to the reader in electronic form.

At a block 404, the security document is parsed. In one embodiment, a parser such as, for example, the security document parser 304 (FIG. 3) parses the security document to identify each security concept contained in the security document. In some embodiments, the security document is written so that each paragraph addresses a security concept. The parser can then separate out each paragraph as a security concept.

At a block 406, sample documents are received. In one embodiment, a vocabulary builder such as, for example, the interactive vocabulary builder 306 (FIG. 3) receives one or more sample documents. The sample documents can be samples such as samples 110 (FIG. 1), provided by the user. The user would ideally provide, in a form suitable for text mining, existing documents known to describe one or more aspects of the project as samples.

At a block 408, the samples are searched for features (e.g., words, phrases, acronyms, common misspellings of the words or acronyms, etc.) that are related to the security concepts parsed from the security document. In one embodiment, a feature generator such as, for example, the feature generator 310 (FIG. 3) finds features in the samples that are related to the security concepts. For example, in one embodiment the feature generator uses a text mining algorithm such as chi square or expected mutual information measure (EMIM) to identify features in the samples that are related to a security concept. In such an embodiment, the feature generator would iteratively perform the text mining algorithm for each security concept parsed from the security document. In some embodiments, the user can manually add features for each security concept.

At a block 410, a search may be performed for more information to use as samples. In one embodiment, a search module such as the external search module 308 (FIG. 3) performs searches via a network such as the external network 112 (FIG. 1) using features found at the block 408. In other embodiments, a text database or document management system may be searched for sample documents. In some embodiments, the user can manually provide search terms for the search module. In some embodiments, the block 410 is an optional operation. The block 408 can then be performed again on any additional information found during the search, as indicated by the dashed arrow in FIG. 4.

At a block 412, the security concepts identified at the block 404 are grouped based on their relatedness. In one embodiment, a related module such as the relatedness module 314 (FIG. 3) organizes the security concepts into groups that allows for distinguishing between similar concepts. As previously described, the relatedness organization in effect identifies "exceptions" to a classification rule. In some embodiments, the block 412 is optional.

At a block 414, classification rules are generated. In one embodiment, a rule generation module such as, for example, the rule generation assistant 312 (FIG. 3) is used to generate classification rules for each security concept identified at the block 404. A classification rule for a particular security concept identifies one or more features that when present in a document indicate or predict that the document (or that a portion of the document) is related to that security concept. That is, the presence of the rule's feature(s) in a document indicates that classified information as defined by the security concept is present in the document. Any suitable statistical algorithm can be used to generate the classification rules. As previously mentioned, one suitable algorithm is the naïve Bayes classifier. The classification rules can then be used by a downgrader tool such as the downgrader 104 (FIG. 1).

Although operational flow 400 is illustrated and described sequentially in a particular order, in other embodiments, the operations described in the blocks may be performed in different orders, multiple times, and/or in parallel. For example, in some embodiments the block 412 is performed immediately after the block 404. Further, in some embodiments, one or more operations described in the blocks may be separated into another block, omitted or combined.

Figure 5:
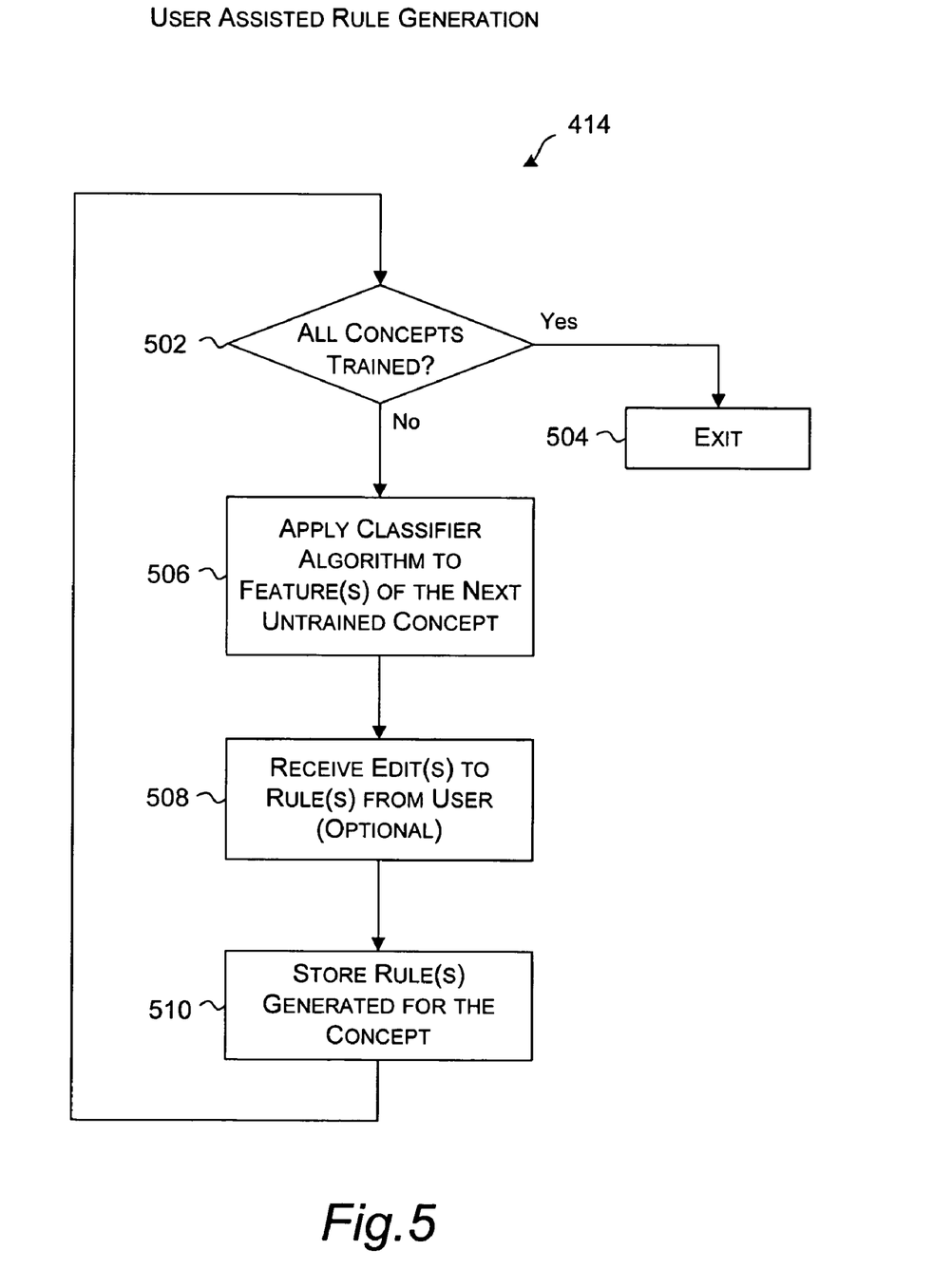
FIG. 5 is a flow diagram illustrating in more detail an operational flow for generating classifier rules from identified features and relatedness of the features, according to one embodiment.

FIG. 5 illustrates an operational flow 500 for implementing the block 414 (FIG. 4), according to one embodiment. Operational flow 500 may be performed in any suitable computing environment. For example, operational flow 500 may be performed by a system such as the system 100 (FIGS. 1, 3). Therefore, the description of operational flow 500 may refer to at least one of the components of FIG. 1 or 3. However, any such reference to components of FIG. 1 or 3 is for descriptive purposes only, and it is to be understood that the implementations of FIGS. 1 and 3 are non-limiting environments for operational flow 500.

At a block 502, it is determined whether the security concepts parsed from the security document at the block 404 (FIG. 4) have all been trained. The term "trained" is used in this context to refer to generating one or more rules for a security concept based on the security concept and the features found at the block 408 (FIG. 4). In one embodiment, a rule generator such as the rule generation assistant 312 determines whether all of the security concepts have been trained. If it is determined that all of the security concepts have been trained, in this embodiment the operational flow 500 proceeds to a block 504 (described below). However, if it is determined that there are untrained security concepts, in this embodiment the operational flow 500 proceeds to a block 506 (described below).

At the block 504, the operational flow 500 exits because all of the security concepts have been trained, thereby completing the performance of the block 414. In one embodiment, the aforementioned rule generator causes the operational flow 500 to exit.

At a block 506, a classifier algorithm is applied to a particular security concept found at block 404, the features found for that security concept at block 408, and the sample documents received at block 406 (FIG. 4). In one embodiment, the rule generator applies the classifier algorithm to the features and samples to generate one or more rules for the particular security concept being processed. In some embodiments, the samples include documents found during a searched performed at the block 410 As previously described, in one embodiment the naïve Bayes algorithm is used. In other embodiments, other text classifier algorithms (including variants of the naïve Bayes algorithm) can be used.

At a block 508, edit(s) to the rule(s) generated at the block 506 are received from the user. In one embodiment, the rule generator is an interactive rule generator module that can receive and process edits from a user. For example, the rule(s) resulting from the application of the classifier algorithm are optionally edited by the user. The user can add features that the user believes are missing from the rule(s) for the security concept being processed and, conversely, delete features that the user believes are unrelated (this scenario is more likely to occur when the number of samples is small). In some embodiments, the operational flow 500 does not include the block 508.

At a block 510, the resulting rule(s) for the security concept being processed is stored for potential use in a downgrader tool. In one embodiment, the rule generator stores the rule(s) in a memory such as the non-volatile storage 264 (FIG. 2). The operational flow 500 then returns to the block 502 to process the next untrained security concept (if any).

Although operational flow 500 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method for generating classifying rules for association with document contents related to a project, the method comprising:

using a first computer having an interactive rule generator module and a second computer having a downgrader module, wherein the second computer may, but need not necessarily be the same as the first computer;

providing, to the interactive rule generator, a security document having a plurality of security concepts and a plurality of features for each security concept for the project embedded therein;

parsing the security document, using the interactive rule generator, to identify an initial set of security concepts and features for the project, a feature being a term that when present in a sample document indicates that at least a portion of the sample document is related to a security concept for the project;

performing, with the interactive rule generator, one or more external network searches for additional features using the features from the initial set as search terms, forming, using the features from the initial set and the additional features found in the search, a vocabulary from which classifying rules can be generated;

providing, to the interactive rule generator, one or more sample documents describing one or more aspects of the project;

statistically mining terms, using an algorithm in the interactive rule generator, in the one or more sample documents that relate to the security concepts the mining based on the classifying rules;

generating, using the interactive rule generator, at least one rule for each security concept based on the security concept, the formed vocabulary, and the statistically mined terms within the one or more sample documents; and filtering the sample documents being considered for dissemination using the downgrader module and the rules generated by the interactive rule generator.

2. The method of claim 1 wherein generating at least one rule further comprises training an automatic classifier to the statistically mined terms.

3. The method of claim 2 wherein the automatic classifier uses a Naive Bayes classifier algorithm.

4. The method of claim 1 further comprising applying an edit received from a user to the at least one rule.

5. The method of claim 1 further comprising grouping a subset of the security concepts based on their relatedness.

6. The method of claim 1 further comprising selectively applying an edit received from a user to the at least one feature identified in the one or more sample documents.

7. One or more non-transitory computer-readable media having thereon instructions that when executed by a computer implement the method of claim 1.

8. The method of claim 1 further comprising identifying at least one term in a technical thesaurus prior to receiving the one or more sample documents.

9. An apparatus for generating classifying rules for association with document contents related to a project, the apparatus comprising:

a first computer having an interactive rule generator module and a second computer having a downgrader module, wherein the second computer may, but need not necessarily be the same as the first computer;

means for providing, to the interactive rule generator, a security document having a plurality of security concepts and a plurality of features for each security concept for the project embedded therein;

means for parsing the security document, using the interactive rule generator, to identify an initial set of security concepts and features for the project, a feature being a term that when present in a sample document indicates that at least a portion of the sample document is related to a security concept for the project;

means for performing, with the interactive rule generator, one or more external network searches for additional features using the features from the initial set as search terms;

means for forming, using the features from the initial set and the additional features found in the search, a vocabulary from which classifying rules can be generated;

means for providing, to the interactive rule generator, one or more sample documents describing one or more aspects of the project;

means for statistically mining terms, using an algorithm in the interactive rule generator, in the one or more sample documents that relate to the security concepts the mining based on the classifying rules;

means for generating, using the interactive rule generator, at least one rule for each security concept based on the security concept, the formed vocabulary, and the statistically mined terms within the one or more sample documents; and means for filtering the sample documents being considered for dissemination using the downgrader module and the rules generated by the interactive rule generator.

10. The apparatus of claim 9 wherein the means for generating at least one rule comprises training an automatic text classifier to the at least one identified feature and the one or more sample documents.

11. The apparatus of claim 9 further comprising means for applying an edit received from a user to the at least one rule.

12. The apparatus of claim 9 further comprising means for applying an edit received from a user to the at least one feature identified in the one or more sample documents.

13. The apparatus of claim 9 further comprising means for grouping a subset of the security concepts based on their relatedness.

14. One or more non-transitory computer-readable media having thereon instructions that when executed by a computer implement the apparatus of claim 9.

* * * * *